(12) United States Patent
Gaertner, II et al.

(10) Patent No.: US 8,466,390 B2
(45) Date of Patent: Jun. 18, 2013

(54) HEATER CONTROL ARCHITECTURE FOR AN ICE PROTECTION SYSTEM

(75) Inventors: James R. Gaertner, II, Hastings, MN (US); Bradley P. Cornell, Stillwater, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 1180 days.

(21) Appl. No.: 12/008,025

(22) Filed: Jan. 8, 2008

(65) Prior Publication Data

US 2009/0177326 A1    Jul. 9, 2009

(51) Int. Cl.
*B64D 15/00*    (2006.01)
*H05B 3/02*    (2006.01)

(52) U.S. Cl.
USPC ........... 219/483; 219/201; 219/482; 219/492; 219/494; 244/134 R; 244/134 D

(58) Field of Classification Search
USPC ................. 219/201, 202, 213, 482, 483, 492, 219/494, 497, 523; 244/134 R, 134 D, 134 E; 701/3
See application file for complete search history.

(56) References Cited

U.S. PATENT DOCUMENTS

| 6,237,874 | B1 | 5/2001 | Rutherford et al. |
| 7,580,777 | B2 * | 8/2009 | Smith et al. ........................ 701/3 |
| 7,604,202 | B2 * | 10/2009 | Froman et al. ............. 244/134 D |
| 2006/0139412 | A1 * | 6/2006 | Sakurai et al. .................. 347/61 |

* cited by examiner

*Primary Examiner* — Brian Jennison
(74) *Attorney, Agent, or Firm* — Edwards Wildman Palmer LLP; Scott D. Wofsy; Christopher J. Capelli

(57) ABSTRACT

A heater control structure for an ice protection system is disclosed that includes a first multi-role logic block having a first scheduler to schedule the operation of an array of heaters and a first controller to control a first group of heaters within the array of heaters, wherein the first scheduler communicates with a first private data bus and the first controller communicates with a second private data bus, and wherein the first scheduler and the first controller communicate with one another over a first pair of inter-channel data busses. The structure further includes a second multi-role logic block having a second controller to control a second group of heaters within the array of heaters and a second scheduler to schedule the operation of the array of heaters, wherein the second controller communicates with the first private data bus and the second scheduler communicates with the second private data bus, and wherein the second controller and the second scheduler communicate with one another over a second pair of inter-channel data busses.

20 Claims, 3 Drawing Sheets

HEATER CONTROL ARCHITECTURE FOR AN ICE PROTECTION SYSTEM

BACKGROUND OF THE INVENTION

1. Field of the Invention

The subject invention is directed to heater control structure for an ice protection system, and more particularly, to the architecture for a multi-zoned, multi-segmented heater control system for use in conjunction with an aircraft ice protection system.

2. Description of Related Art

Since the early days of powered aviation, aircraft have been troubled by the accumulation of ice on critical component surfaces such as wings and struts, under certain flight conditions. Unchecked, accumulations of ice can eventually so laden an aircraft with additional weight and so alter the aerofoil configuration of the wings as to precipitate an unacceptable flying condition. There are three generally accepted approaches that have developed to combat the accumulation of ice on component surfaces of an aircraft under flying conditions. These approaches include thermal de-icing, chemical de-icing and mechanical de-icing.

In the case of thermal de-icing, leading edges (i.e., the edges of an aircraft component on which ice accretes and are impinged upon by the air flowing over the aircraft and having a point at which this airflow stagnates) are heated to loosen adhesive forces between accumulating ice and the component surface. Once loosened, the ice is blown from the component surface by the airstream passing over the aircraft.

In one thermal de-icing approach, heaters are placed in the leading edge zone of the component, either by inclusion in a rubber boot applied over the leading edge of a wing or by incorporation into the skin structure of the component, such as on the leading edge of an engine nacelle. These heaters are typically powered by electrical energy derived from a generating source driven by one or more of the aircraft engines or an auxiliary power unit. The electrical energy is intermittently or continuously supplied to provide heat sufficient to prevent the formation of ice or to loosen accumulating ice.

Heaters used for ice protection on critical component surfaces, such as the leading edge surface of an engine nacelle are often comprised of an array of heater elements divided into multiple zones and segments. In prior art systems, groups of heaters within a particular zone or segment are independently controlled and/or scheduled. For example, in an array of fifteen heaters, there may be five independently controlled and scheduled groups of heaters. This type of distributed architecture is relatively complex in that it requires separate circuitry to drive each group of heaters. This results in an undesirably large and heavy hardware package in an environment where minimizing size and weight is preferable. Furthermore, because each group of heaters in the array is independently driven, the failure of a controller or scheduler in any one group will render that group inoperable. In other words, prior art distributed heater control systems do not have redundant control and/or scheduling capabilities.

It would be beneficial therefore to provide heater control architecture for a multi-zoned, multi-segmented ice protection system that has reduced complexity, size and weight relative to prior art heater control architecture, and provides redundant heater control and scheduling capability.

SUMMARY OF THE INVENTION

The subject invention is directed to a new and useful heater control structure for an ice protection system adapted for employment in an aircraft, and more particularly, for use in conjunction with a multi-zoned, multi-segmented anti-icing/de-icing system for a leading edge surface of an aircraft component, such as, for example, the leading edge surface of an engine nacelle.

The heater control structure includes a first multi-role logic block having a first scheduler to schedule the operation of an array of heaters and a first controller to control a first group of heaters within the array of heaters. The first scheduler communicates with a first private data bus and the first controller communicates with a second private data bus. In addition, the first scheduler and the first controller communicate with one another over a first pair of independent inter-channel data busses.

The heater control structure of the subject invention further includes a second multi-role logic block having a second controller to control a second group of heaters within the array of heaters and a second scheduler to schedule the operation of the array of heaters. The second controller communicates with the first private data bus and the second scheduler communicates with the second private data bus. In addition, the second controller and the second scheduler communicate with one another over a second pair of independent inter-channel data busses.

There are additional communication paths that enable communication between the first and second schedulers. For example, the first scheduler can communicate with the second scheduler via the second controller by way of the first private data bus and then through the second inter-channel data bus. Alternatively, the second scheduler can communicate with the first scheduler via the first controller by way of the second private data bus and then through the first inter-channel data bus.

In accordance with a preferred embodiment of the subject invention, with respect to the first multi-role logic block the first scheduler interfaces with a first external data bus and the first controller interfaces with a second external data bus. Similarly, with respect to the second multi-role logic block the second scheduler interfaces with the second external data bus and the second controller interfaces with the first external data bus.

The first and second schedulers are adapted and configured to functionally back one another up. Thus, in case of a failure of one of the schedulers, the other scheduler assumes the scheduling function of the failing scheduler. Additionally, the first scheduler is adapted to assume the function of the first controller if the first controller fails, and the second scheduler is adapted to assume the function of the second controller if the second controller fails.

It is envisioned that the heater control structure of the subject invention can also include at least one additional single-role logic block associated with an additional group of heaters within the array of heaters. The single-role logic block preferably includes first and second additional controllers to control the additional group of heaters. Here, the first additional controller communicates with the first private data bus, the second additional controller communicates with the second private data bus, and the first and second additional controllers communicate with one another over another pair of independent inter-channel data busses. Alternative communication paths are also available, as described above, with respect to the first and second multi-role logic blocks.

In accordance with a preferred embodiment of the subject invention, each logic block includes first and second heater driver switching means. In addition, each logic block includes first and second safety relays to protect the heaters associated therewith in the event of a failure of a heater driver switching means. Each logic block is also adapted and configured to read temperature sensor feedback information relating to the heaters associated therewith.

It is envisioned that the heater control structure of the subject invention can be employed in connection with various ice protection systems employed on critical component surfaces of an aircraft including, for example, ice protection systems employed in an engine nacelle or on the leading edge of a wing or horizontal stabilizer. By way of example, in the case of an ice protection system for an engine nacelle, it is envisioned that the multi-role logic blocks of the system could reside in the aircraft fuselage and manipulate heaters performing an anti-icing function in the engine nacelle. Any additional single-role logic blocks of such an exemplary system could reside in the engine nacelle and manipulate heaters performing a de-icing function in the engine nacelle.

These and other features and benefits of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the multi-zoned, multi-segmented flexible heater control system of the subject invention without undue experimentation, preferred embodiments thereof will be described in detail hereinbelow with reference to certain figures, wherein.

DETAILED DESCRIPTION OF PREFERRED EMBODIMENTS

Figure 1:
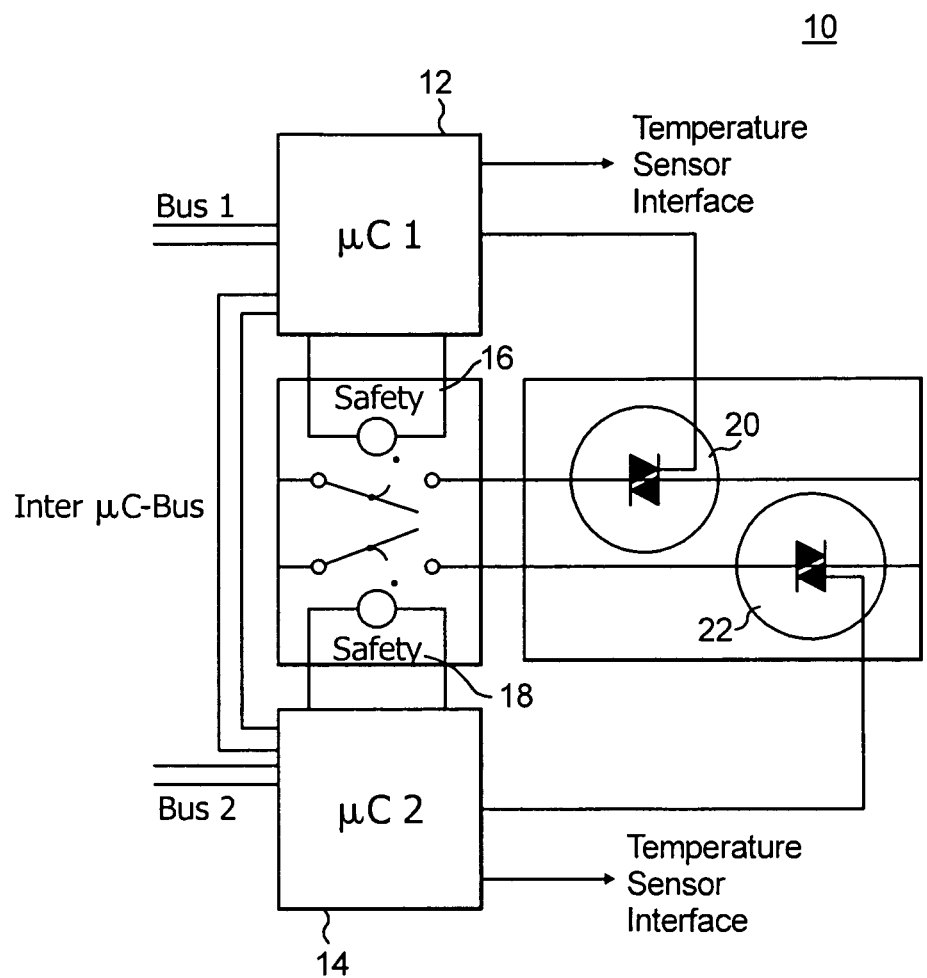
FIG. 1 is a switch module constructed in accordance with a preferred embodiment of the subject invention, which includes, among other things, two micro-controllers, two sets of safety relays and two sets of heater driver switching devices.

Referring now to the drawings wherein like reference numerals identify similar features of the subject invention, there is illustrated in FIG. 1 a switch module constructed in accordance with a preferred embodiment of the subject invention and designated generally by reference number 10. Switch module 10 is the core functional element of the heater control system of the subject invention, which will be described in more detail below with respect to FIG. 2. The number of switch modules 10 used in a particular ice protection system will vary depending upon the number and/or demand of heater loads in a given multi-zoned, multi-segmented heater array.

Referring now to FIG. 1, switch module 10 defines a circuit that includes first and second micro-controllers 12 and 14, two safety relays 16 and 18, and two heater driver switching devices 20 and 22, which perform the switching function for the heaters in a particular zone of a multi-zoned, multi-segmented heater array. The first and second micro-controllers 12 and 14 of switch module 10 interface with temperature sensors associated with the heaters controlled thereby.

Those skilled in the art will readily appreciate that the switching devices 20, 22 can be configured in many different ways depending upon the architecture of the ice protection system. That is, the type of switching device would be selected and optimized based upon the number of heater loads serviced thereby. For example, the switching devices may be configured as two silicon controlled rectifiers (SCRs), a singular component like a metal-oxide-semiconductor field-effect transistor (MOSFET) or a TRIAC (TRIode for Alternating Current) which is an electronic component approximately equivalent to two SCRs joined in inverse parallel (paralleled but with the polarity reversed) and with their gates connected together.

The safety relays 16, 18 function as safety valves in the event that a respective heater switching device fails. In this regard, a relay is opened to keep the heater circuitry from burning up the heater elements in the array. Those skilled in the art will readily appreciate that the switch module 10 has a dual redundant architecture. That is, each channel within the module (e.g., Channel A and Channel B) contains a separate micro-controller, separate heater switching device and separate safety relay. The redundant system architecture disclosed herein is reliable and safe.

Other components associated with fault isolation and system health are not included in switch module 10. These include, for example, current monitors, voltage monitors and the like. They are preferably external to the switch module 10. However, the analog outputs and digital outputs of these external devices must interface with both of the micro-controllers 12, 14 within each switch module block 10. Additionally, each channel within a switch block 10 (e.g., Channel A and Channel B) must have an independent power source, as well as independent analog and digital inputs, in order to maintain isolation.

Figure 2:
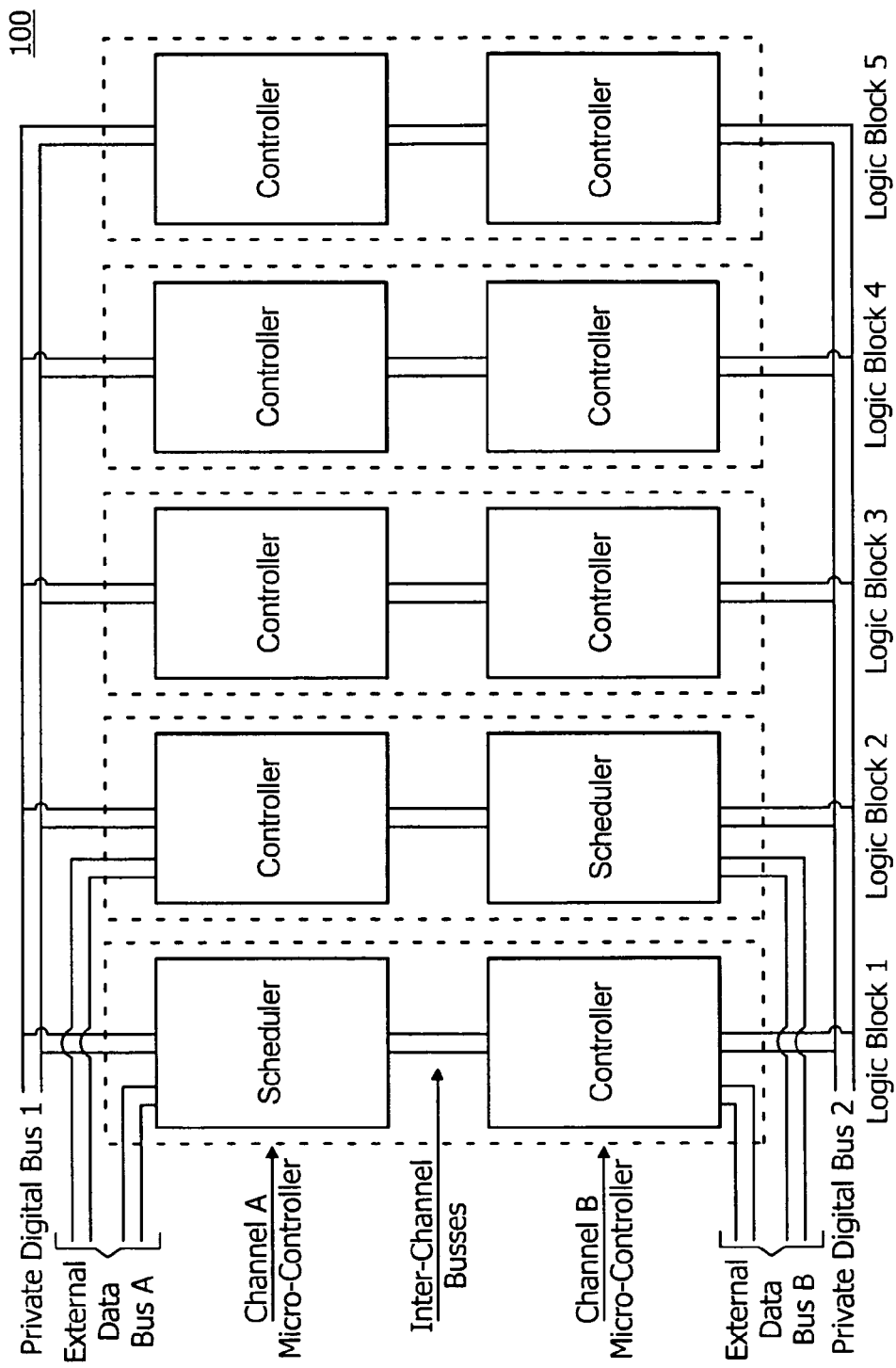
FIG. 2 is a schematic representation of the micro-controller architecture of the subject invention, which includes a plurality of logic blocks, each formed by a switch module of the type shown in FIG. 1.

Referring now to FIG. 2, there is illustrated an example of the micro-controller architecture of the subject invention, which is designated generally by reference numeral 100. The micro-controller architecture 100 of the subject invention is particularly well adapted for use in conjunction with an ice protection system, and more particularly to an anti-ice/de-ice heater control system employed on an aircraft. The architecture 100 can be employed, for example, in an engine nacelle or on the leading edge of a wing or horizontal stabilizer where a multi-zoned, multi-segmented heater configuration is employed.

Micro-controller architecture 100 includes a plurality of logic blocks. Each logic block is comprised of a switch module 10 shown in FIG. 1. As explained in further detail below, the exemplary architecture includes five logic blocks. However, it should be readily understood that the number of logic blocks varies by design depending upon the size and needs of the heater configuration.

Of the five exemplary units, Logic Blocks 1 and 2 are referred to herein as multi-role logic blocks. They are logically identical to one another in that one of the micro-controllers serves as a scheduler and the other micro-controller serves as a controller. This provides redundant functionality. In other words, with respect to Logic Blocks 1 and 2 there exists a backup micro-controller for the purpose of scheduling. Moreover, as described in detail below, the first and second scheduling micro-controllers are adapted to functionally back one another up in case of a failure of one of the scheduling micro-controllers. That is, the first scheduler is adapted to assume the function of the first controller if the first controller fails, and the second scheduler is adapted to assume the function of the second controller if the second controller fails. Thus if the first scheduler (Logic Block 1) fails while performing the scheduling role, the second scheduler (Logic Block 2) takes over the role of scheduling the system. If by chance the second controller (Logic Block 2) fails, the second scheduler (Logic Block 2) must also assume that role as well.

In contrast to the multi-role Logic Blocks 1 and 2, Logic Blocks 3 through 5 have only one functional role, which is to manage certain groups or sets of heaters within the system or array of heaters. More particularly, the two micro-controllers in each of the single-role Logic Blocks 3 through 5 serve as controllers. This means that in each single-role logic block one controller is the back up for the other controller in the logic block. Should one of these micro-controllers fail, the alternate controller is available to operate the heater elements and switching device associated with that particular logic block. During operation, the micro-controller functioning as the system scheduler will designate which of the two controllers in a single-role logic block is to serve as the controller for the group of heaters managed by that logic block.

In the system of the subject invention, the sole responsibility of a controller is to manipulate a certain group of heaters and ascertain heater health. In contrast, the primary responsibility of a scheduler is to control the operation of the entire system. In particular, the scheduler determines which heaters are to be turned on, when to turn heaters on and for how long each heater is to remain on. The scheduler also has the responsibility of interfacing with the aircraft both discretely and by way of an external data communication bus. Additionally, each controller will monitor heater currents and voltages to annunciate faults, which may, depending on the severity of the fault, be dealt with at the scheduler level of control, or the controller level of control.

The specific configuration of the external data communication bus interface is not described in the subject application. However, the dual redundant nature of the external data communications busses is described herein and encompassed within the scope of the subject disclosure. External data relating to system health, system actuation and system status are relayed over the external data communication busses to the aircraft.

Figure 3:
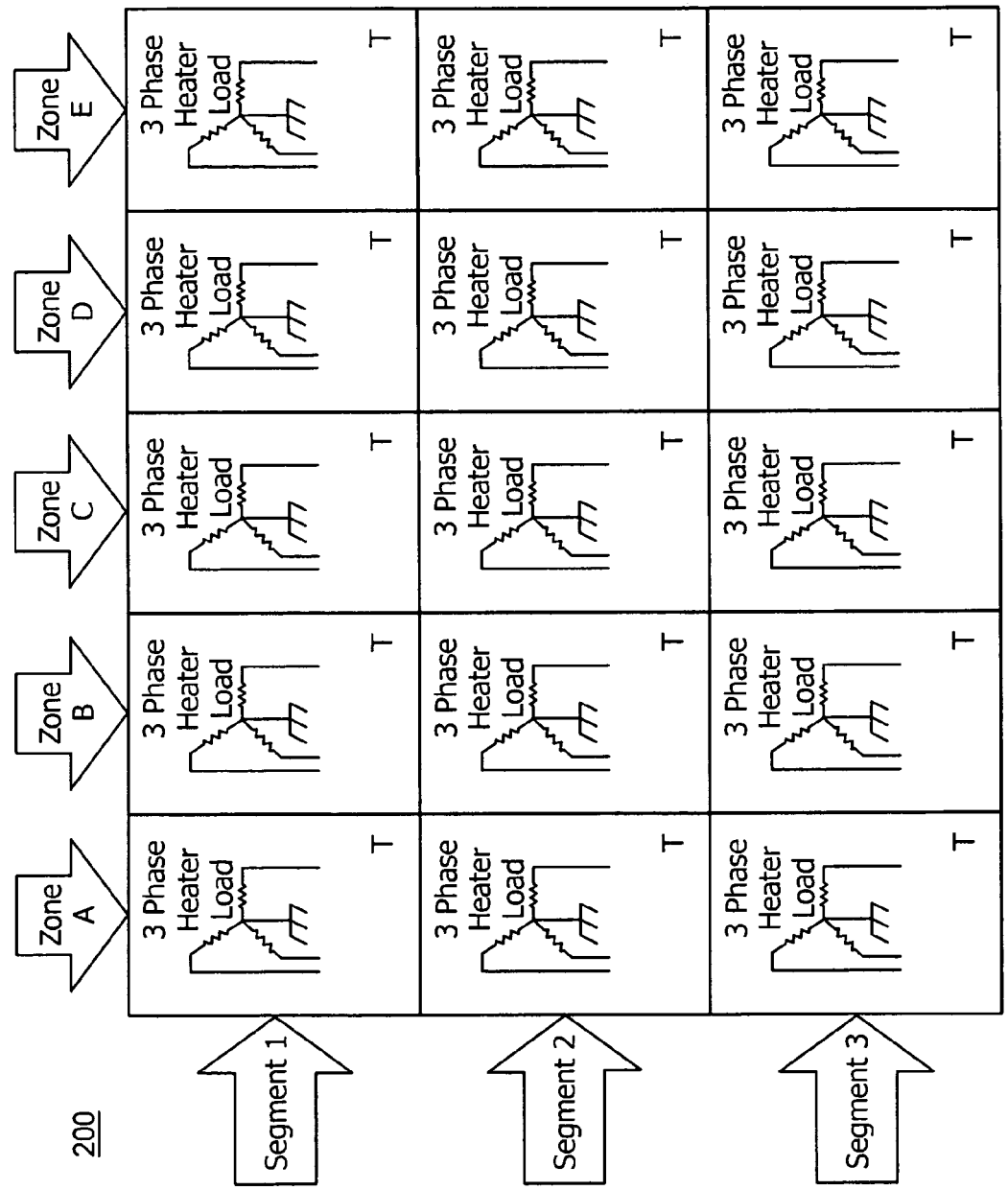
FIG. 3 is a schematic representation of a multi-zoned, multi-segmented heater load array adapted and configured to be driven by the micro-controller architecture of FIG. 2, wherein each heater load has a temperature sensor associated therewith as shown.

Referring now to FIG. 3, a typical heater arrangement for an anti-ice/de-ice heater system is represented as an array of heater elements designated generally by reference numeral 200. As shown, the heater elements are three-phase heater elements. However, other types of heater elements may be employed in the subject ice protection system, including for example, single-phase heaters.

The heater array 200 is divided into logical groupings, based on the number of heater elements that a particular logic block manages. For example, Logic Block 5 may drive a group of heaters such as those in Segment 1, Zones A, B and E. Correspondingly, Logic Blocks 4 and 3 would drive heaters in Segment 2, Zones A, B and E and Segment 3, Zones A, B and E, respectively. Logic Block 1 would drive heaters in Zone C, Segments 1, 2 and 3. Logic Block 2 would drive heaters in Zone D, Segments 1, 2 and 3. Again, the numbers of heaters in each group can vary.

As illustrated in FIG. 2, the system 100 has a redundant data bus architecture designed to ensure continuous data communication among and between the logic blocks in the event of any data bus failures. In particular, the system 100 includes two private digital data communication busses (i.e., Private Digital Bus 1 and Private Digital Bus 2), which carry redundant data. Moreover, Private Digital Bus 1 and Private Digital Bus 2 are private system data busses for the plurality of logic blocks (i.e., Logic Block 1 through 5) within the system architecture, and they are the only consumers of this data bus.

Private Digital Bus 1 is in direct communication with the Channel A micro-controllers in each logic block. Thus, Private Digital Bus 1 communicates directly with the scheduler of Logic Block 1 and with the controller of Logic Block 2, as well as the Channel A controllers of each of the additional single role logic blocks 3 through 5. Similarly, Private Digital Bus 2 communicates directly with the controller of Logic Block 1 and with the scheduler of Logic Block 2, as well as the Channel B controllers of each of the additional single role logic blocks 3 through 5.

In addition to the Private Digital Busses for the Channel A and Channel B micro-controllers, there is a pair of inter-channel data busses within each logic block. These inter-channel busses enable internal communication and information exchange between the two micro-controllers. Thus, for example, in Logic Block 1, there is a first pair of inter-channel busses between the Channel A scheduler and the Channel B controller, and in Logic Block 2 there is a second pair of inter-channel busses between the Channel A controller and the Channel B scheduler.

During operation, redundant control/scheduling data and any other required system data, is passed on Private Digital Bus 1 and Private Digital Bus 2. Thus, if Private Digital Bus 1 has a failure, the information is still being passed to each of the Channel A micro-controllers by way of Private Digital Bus 2 and the inter-channel busses in each logic block. In other words, because redundant data is passed on both Bus 1 and Bus 2, information may be received on either bus and may be available to either a Channel A or Channel B micro-controller. Consequently, each microcontroller within a given logic block of system 100 must repeat the data it has received over the inter-channel data bus to the other local micro-controller.

In an effort to have a robust system, each of the two scheduling micro-controllers in system 100 has a secondary responsibility. That is, the Channel A scheduling micro-controller in Logic Block 1 also performs the functional role of backup controller for the Channel B controller in Logic Block 1. Similarly, the Channel B scheduling micro-controller in Logic Block 2 also performs the functional role of backup controller for the Channel A controller of Logic Block 2. The scheduler still maintains its primary role of scheduling, in addition to the new secondary role of controlling.

Referring to FIG. 3, there is illustrated an exemplary heater load array 200 wherein the array is represented by zones A through E and Segments 1 through 3. Each zone includes three 3-phase heaters and each includes a temperature sensor "T". Referring to FIG. 3 in conjunction with FIG. 2, assume Logic Block 1 maintains and regulates heaters in Zone C, Segments 1, 2 and 3 of array 200. Likewise, assume the heaters in Zone D, Segments 1, 2, and 3 of array 200 are maintained by Logic Block 2. If the Channel A controller of Logic Block 2 fails, then the Channel B scheduler of Logic Block 2 must assume the heater control formerly assigned to the Channel A controller.

In another example, if the Channel A scheduler in Logic Block 1 fails, the Channel B scheduler of Logic Block 2 assumes the system scheduling role. The Channel B controller continues to operate as a controller for the Logic Block 1 heaters. In a third example, if the Channel B controller of Logic Block 1 fails, the Channel A scheduler assumes a secondary role of controlling the Logic Block 1 heaters. The Logic Block 1 Channel A micro-controller also continues to be the system scheduler.

Another feature integrated into the logic blocks of the subject invention is temperature sensor feedback, as explained above. Some heaters require temperature feedback to perform an anti-ice function, while others performing a de-ice function do not need the temperature sensor feedback. By requiring each logic block to process this information, additional system flexibility is gained, since any logic block can perform either the de-ice function or the anti-ice function. For example, Logic Blocks 3 through 5 may reside in an aircraft engine nacelle to drive local de-ice zones. In contrast, Logic Blocks 1 and 2 may reside in the aircraft fuselage and perform an anti-ice function on the heaters within the engine nacelle.

The logic blocks located in the aircraft fuselage need temperature feedback, but passing back an analog signal over such a long distance is undesirable. Since the de-ice logic blocks are located in the engine nacelle, it is much more desirable to process these signals within the engine nacelle. The data can then be transmitted over the private busses to the anti-ice logic blocks located in the fuselage, where those data consumers are located.

It should be readily appreciated that the heater control architecture of the subject invention does not require the use of specific AC/DC heaters, applied voltages, wattages or AC heater configurations (i.e., Wye or Delta configuration). Indeed, it is possible that the several different wattages may be required for various logic blocks. Those skilled in the art will readily appreciate that such features will vary depending upon the design requirements of a particular system. For example, in one application a logic block may be an array of DC heaters of 1 kVA. The same logic block could alternatively be an array of Wye connected heater loads of 1.8 kVA each in another application.

The heater control architecture described herein will support expansion from the base system of two multi-role logic blocks. Moreover, the minimal system requirement is two logic blocks having micro-controllers that perform scheduling roles. Those skilled in the art will readily appreciate that the number of logic blocks included in the system will depend upon the size and needs of the heater array. Because of the modular expandability of the system, it is envisioned that the same control software can be utilized for a variety of different hardware applications.

The logic blocks that make up the heater control system of the subject invention are preferably all the same size in terms of the number of heater zones that can be driven and the temperature sensor signals they can process. These logic blocks may reside in the same package or each logic block can be contained in an independent package depending upon the system needs and configuration.

Alternatively, the logic blocks performing a de-icing function may be packaged together, while the logic blocks performing an anti-icing function may be packaged together. To accommodate different logic blocks and their varying heater assignments, differing amounts of waste heat dissipation will be required. Consequently, it is envisioned that different heat sink designs would be provided for small, medium and large by-product power dissipation levels in different logic blocks.

While the heater control architecture of the subject invention has been shown and described with reference to preferred embodiments, those skilled in the art will readily appreciate that various changes and/or modifications may be made thereto without departing from the spirit and/or scope of the subject invention as defined by the appended claims.

What is claimed is:

1. A heater control structure for an ice protection system, comprising: a) a first multi-role logic block including a first scheduler to schedule the operation of an array of heaters and a first controller to control a first group of heaters within the array of heaters, wherein the first scheduler communicates with a first private data bus and the first controller communicates with a second private data bus, and wherein the first scheduler and the first controller communicate with one another over a first pair of independent inter-channel data busses; and b) a second multi-role logic block including a second controller to control a second group of heaters within the array of heaters and a second scheduler to schedule the operation of the array of heaters, wherein the second controller communicates with the first private data bus and the second scheduler communicates with the second private data bus, and wherein the second controller and the second scheduler communicate with one another over a second pair of independent inter-channel data busses.

2. A heater control structure as recited in claim 1, wherein the first scheduler interfaces with a first external data bus and the first controller interfaces with a second external data bus.

3. A heater control structure as recited in claim 2, wherein the second scheduler interfaces with the second external data bus and the second controller interfaces with the first external data bus.

4. A heater control structure as recited in claim 1, further comprising at least one additional single-role logic block associated with an additional group of heaters within the array of heaters.

5. A heater control structure as recited in claim 4, wherein the at least one additional single-role logic block includes a first additional controller to control said additional group of heaters and a second additional controller to control said additional group of heaters.

6. A heater control structure as recited in claim 5, wherein the first additional controller communicates with the first private data bus and the second additional controller communicates with the second private data bus.

7. A heater control structure as recited in claim 6, wherein the first and second additional controllers communicate with one another over a pair of independent inter-channel data busses.

8. A heater control structure as recited in claim 1, wherein each logic block includes first and second heater driver switching means.

9. A heater control structure as recited in claim 8, wherein each logic block includes first and second safety relays to protect the heaters associated therewith in the event of a failure of a heater driver switching means.

10. A heater control structure as recited in claim 1, wherein each logic block is adapted and configured to read temperature sensor feedback information relating to the heaters associated therewith.

11. A heater control structure as recited in claim 1, wherein the first and second schedulers are adapted to functionally back one another up in case of a failure of one of the schedulers.

12. A heater control structure as recited in claim 1, wherein the first scheduler is adapted and configured to assume the function of the first controller if the first controller fails, and wherein the second scheduler is adapted and configured to assume the function of the second controller if the second controller fails.

13. A heater control structure for an ice protection system, comprising: a) a first multi-role logic block including a first scheduler to schedule the operation of an array of heaters and a first controller to control a first group of heaters within the array of heaters, wherein the first scheduler communicates with a first private data bus and the first controller communicates with a second private data bus, and wherein the first scheduler and the first controller communicate with one another over a first pair of independent inter-channel data busses; b) a second multi-role logic block including a second controller to control a second group of heaters within the array of heaters and a second scheduler to schedule the operation of the array of heaters, wherein the second controller communicates with the first private data bus and the second scheduler communicates with the second private data bus, and wherein the second controller and the second scheduler communicate with one another over a second pair of independent inter-channel data busses; and c) a plurality of single-role logic blocks each associated with an additional group of heaters and each including first and second additional micro-controllers, wherein both of the additional micro-controllers are adapted to control said additional group of heaters, and wherein the first additional micro-controller in each single-role logic block communicates with the first private data bus and the second additional micro-controller in each single role logic block communicates with the second private data bus.

14. A heater control structure as recited in claim 13, wherein the first scheduler interfaces with a first external data bus and the first controller interfaces with a second external data bus.

15. A heater control structure as recited in claim 13, wherein the second scheduler interfaces with the second external data bus and the second controller interfaces with the first external data bus.

16. A heater control structure as recited in claim 13, wherein each logic block includes first and second heater driver switching means.

17. A heater control structure as recited in claim 16, wherein each logic block includes first and second safety relays to protect the heaters associated therewith in the event of a failure of a heater driver switching means.

18. A heater control structure as recited in claim 13, wherein each logic block is adapted and configured to read temperature sensor feedback information relating to the heaters associated therewith.

19. A heater control structure as recited in claim 13, wherein the first and second schedulers are adapted to functionally back one another up in case of a failure of one of the schedulers.

20. A heater control structure as recited in claim 13, wherein the first scheduler is adapted and configured to assume the function of the first controller if the first controller fails, and wherein the second scheduler is adapted to assume the function of the second controller if the second controller fails.

* * * * *